United States Patent [19]
Berube
[11] 3,980,990
[45] Sept. 14, 1976

[54] FERROMAGNETIC CURRENCY VALIDATOR

[76] Inventor: Arthur A. Berube, 11 Hudson St., Methuen, Mass. 01844

[22] Filed: Sept. 12, 1974
[21] Appl. No.: 505,260
[52] U.S. Cl. ........................ 340/149 R; 340/149 A; 235/61.11 K
[51] Int. Cl.² ........................ H04Q 3/00
[58] Field of Search ......... 340/149 R, 149 A, 146.3; 235/61.12 M, 61.7 B, 61.11 K

[56] References Cited
UNITED STATES PATENTS

| | | | |
|---|---|---|---|
| 2,992,408 | 7/1961 | Eldredge | 340/149 A |
| 3,391,388 | 7/1968 | Riddle | 340/149 R |
| 3,509,535 | 4/1970 | Berube | 340/149 A |

*Primary Examiner*—Harold I. Pitts
*Attorney, Agent, or Firm*—Kenyon & Kenyon Reilly Carr & Chapin

[57] ABSTRACT

An improved ferromagnetic currency validator which permits hand held operation. Means in the hand held device detect speed of movement across the bill being validated and open a gate of variable length in response thereto to measure proper positioning and ferromagnetic content of lines on the bill.

8 Claims, 5 Drawing Figures

FERROMAGNETIC CURRENCY VALIDATOR

BACKGROUND OF INVENTION

This invention relates to currency validators in general and more particularly to a portable hand-held currency validator operating on the ferromagnetic principle.

U.S. paper currency contains on the portrait surface of the bill and in other areas a series of closely spaced parallel lines of ferromagnetic ink. For example these appear in the background area surrounding the portrait. The ferromagnetic line spacing is very precise and is difficult to duplicate by unauthorized means. This makes the counterfeiting of these bills in a form which duplicates to the ferromagnetic pattern quite difficult. As a result, ferromagnetic detection of these lines has become recognized as a manner of detecting currency validity. Thus, various devices have been developed for validating currency and other documents having this type of ferromagnetic pattern. Typical of such is that disclosed in my previous U.S. Pat. No. 3,509,535. The system disclosed therein, along with other prior art systems all require a transport mechanism to drive the currency past a detection head. As a result, currency validators have had a limited application with their most common use being for dollar bill changers and the like. There is, however, a need for currency validators which can be held by a clerk or sales person in a store and which may be used to validate currency given to him. Sales people to some extent can be trained to detect counterfeit currency. However, because of the increased sophistication of counterfeiters and the high turnover among clerical personnel, a large number of counterfeit bills are accepted. Thus, there is a need for a simple inexpensive hand-held currency validator.

SUMMARY OF INVENTION

The present invention provides such a currency validator. In its simplest embodiment, it comprises a unit including a detection head which senses the ferromagnetic lines on the bill as the user moves it across the bill and integrates the sensed magnetic energy level. If sufficient magnetic energy is detected, the integrator reaches a level which turns on an indicator lamp. Even this simple validator goes a long way to solving the needs of retail stores and the like. For a bill to be detected as valid, it must contain magnetic ink although not necessarily in the proper amount with the proper line spacing. Because magnetic ink is difficult to work with it is generally avoided by counterfeiters and thus a counterfeit bill is likely not to have any magnetic ink.

The second embodiment of the invention is more sophisticated and determines not only the presence or absence of magnetic ink but proper line spacing and a proper level of ferrous oxide. It is even more difficult for the counterfeiter to provide magnetic ink both in the required amounts and at the required spacings. Thus, the second embodiment of the present invention includes means for counting a plurality of lines to determine the rate of motion and gating means responsive thereto to check spacing between lines. It also includes a slope detector insuring that the proper energy level of the ferrous oxide is present.

DETAILED DESCRIPTION OF THE PREFERRED EMBODIMENT

Figure 1:
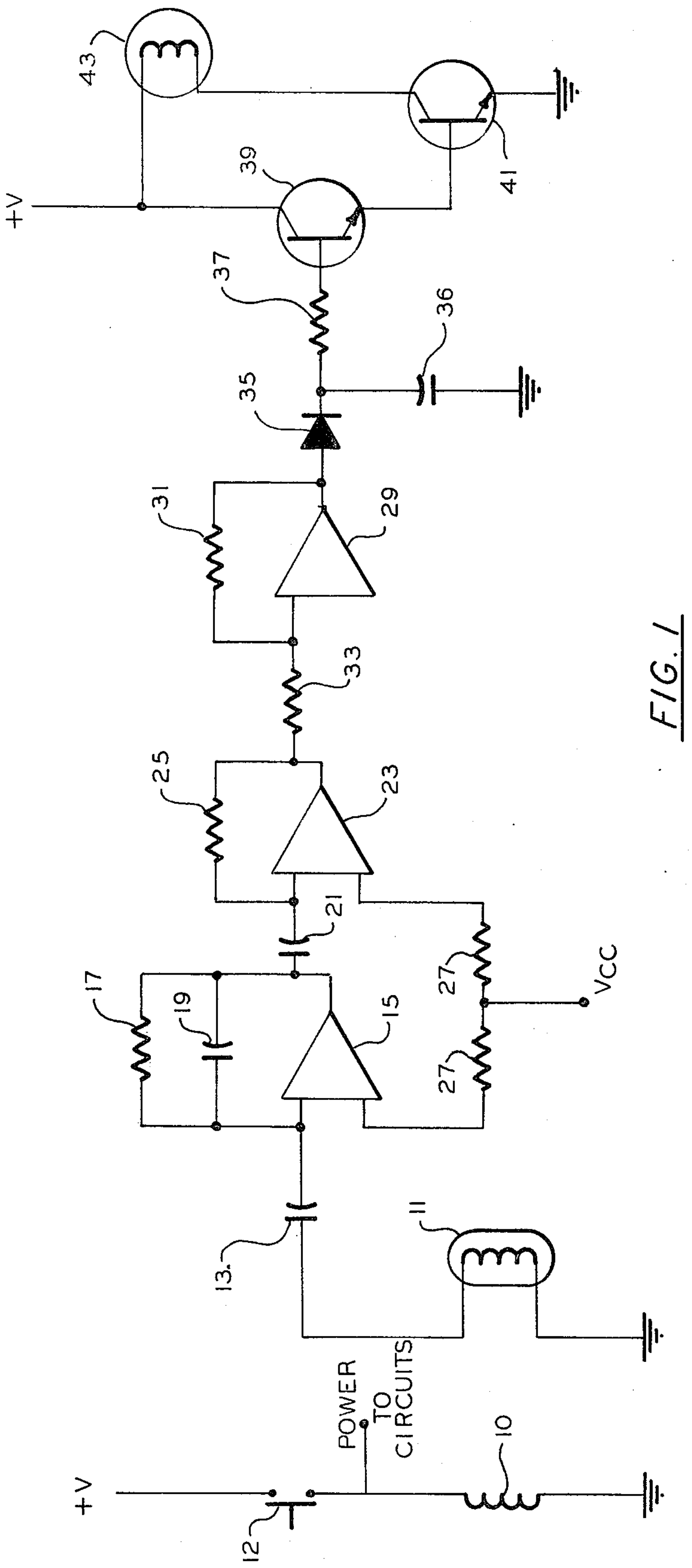
FIG. 1 is a circuit diagram of a first embodiment of the invention.

FIG. 1 illustrates a simplified currency validator according to the present invention. A DC magnetic source 10 similar to that described in my previous patent referenced above is provided along with a detection head 11 in a small hand-held package. The package also includes the remainder of the circuitry shown in FIG. 1. The source 10 along with the remainder of the circuitry is powered by a battery 14 through a push button switch 12. This results in power being on only when switch 12 is held down resulting in conservation of battery power.

The device can also be powered through a DC power supply. Such would be particularly attractive in an application where the device is used in conjunction with a cash register. Also the magnetic source can be a permanent magnet rather than a DC electromagnet. The detection head 11 is coupled through a capacitor 13 to the inverting input of an operational amplifier 15. Operational amplifier 15 has in its feed back path a resistor 17 in parallel with the capacitor 19. The output of amplifier 15 is capacitively coupled through capacitor 21 to the inverting input of a second amplifier 23 having a resistor 25 in its feed back path. Both amplifier 15 and amplifier 23 have their non inverting inputs coupled through resistors 27 to a voltage supply. The output of amplifier 23 is provided to a further amplifier 29 having a resistor 31 in its feedback path. This amplifier acts as a pulse shaper. Coupling is through a resistor 33. The output of amplifier 29 is coupled through a diode 35 to a capacitor 36. Capacitor 36 is coupled through a resistance 37 to the base of a transistor 39. Transistor 39 is coupled in a Darlington configuration with transistor 41 which has in its collector path an indicator lamp 43. Thus transistors 39 and 41 can be considered a lamp driver. The collector of transistor 39 and the other side of the lamp are coupled to the positive voltage and the emitter of transistor 41 grounded.

In operation the user passes the detection head 11 over the bill to be validated. As a ferromagnetic line is passed, a pulse is coupled through the capacitor 13 to the amplifier 15 where it is amplified and then coupled into amplifier 23 where further amplification takes place and finally to amplifier 29 where it is shaped to form a square wave. The pulse is then coupled through the diode 35 to the capacitor 36. The capacitor 36 will charge with each pulse until it reaches a level where it will turn on the transistor 39 which in turn turns on transistor 41 to light the indicator lamp. Only if sufficient energy levels are present thus providing a plurality of output pulses which are integrated by the capacitor 36 to the required level occur will the indicator light. The use of capacitive coupling helps to ensure that the magnetic activity is in the forms of lines or the like. That is, the capacitor will only couple AC quantities which can only occur with changing magnetic fields. Thus, a continuous magnetic field will be less likely to trigger the indicator. Since all that is required is relative motion between the bill and the head 11 it is also possible to fix the detection device and for the user to move the bill over the head 11. This permits the device to be attached to or built into a cash register.

Figure 2:
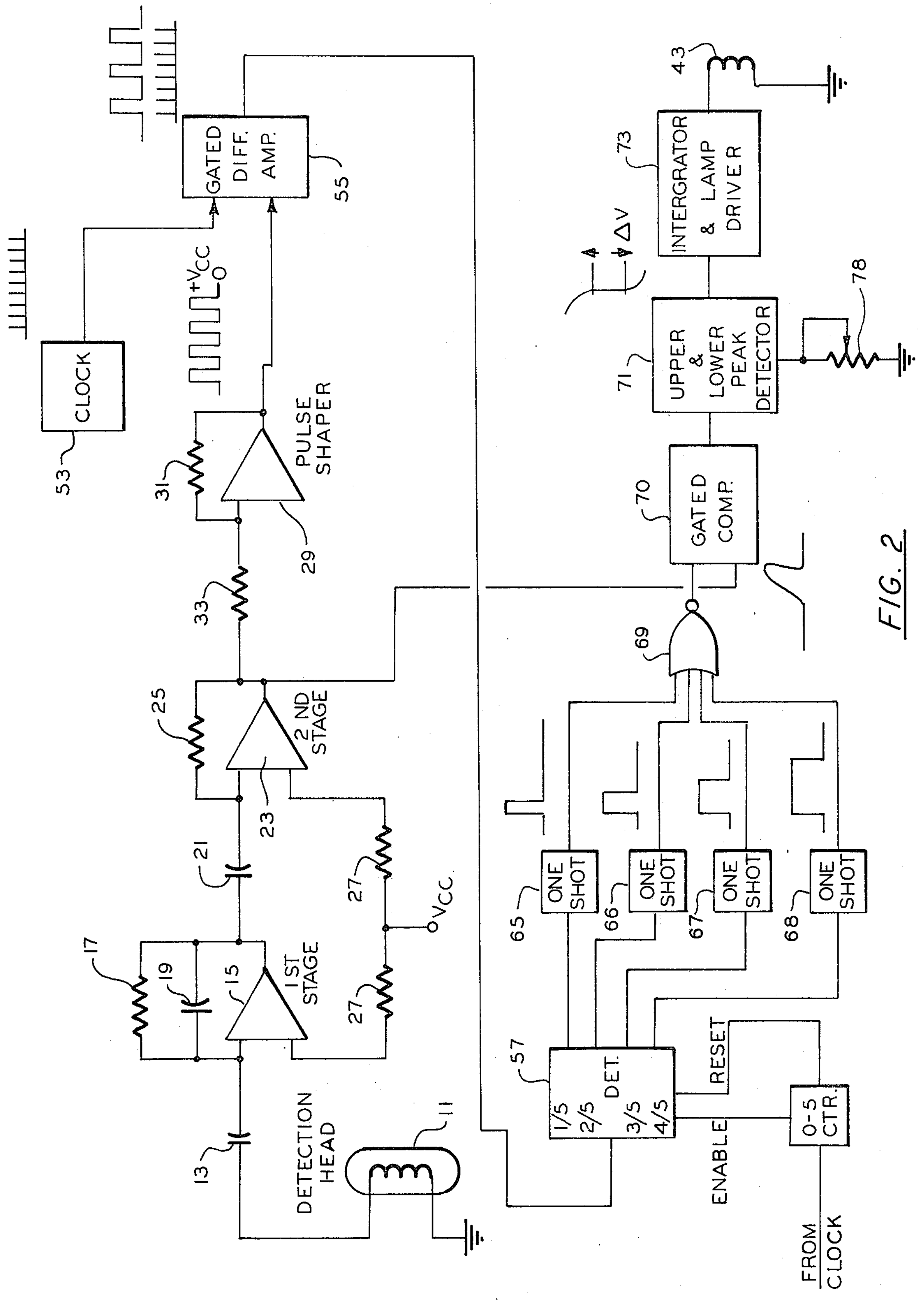
FIG. 2 is a block-logic diagram of a second embodiment of the invention.
Figure 3:
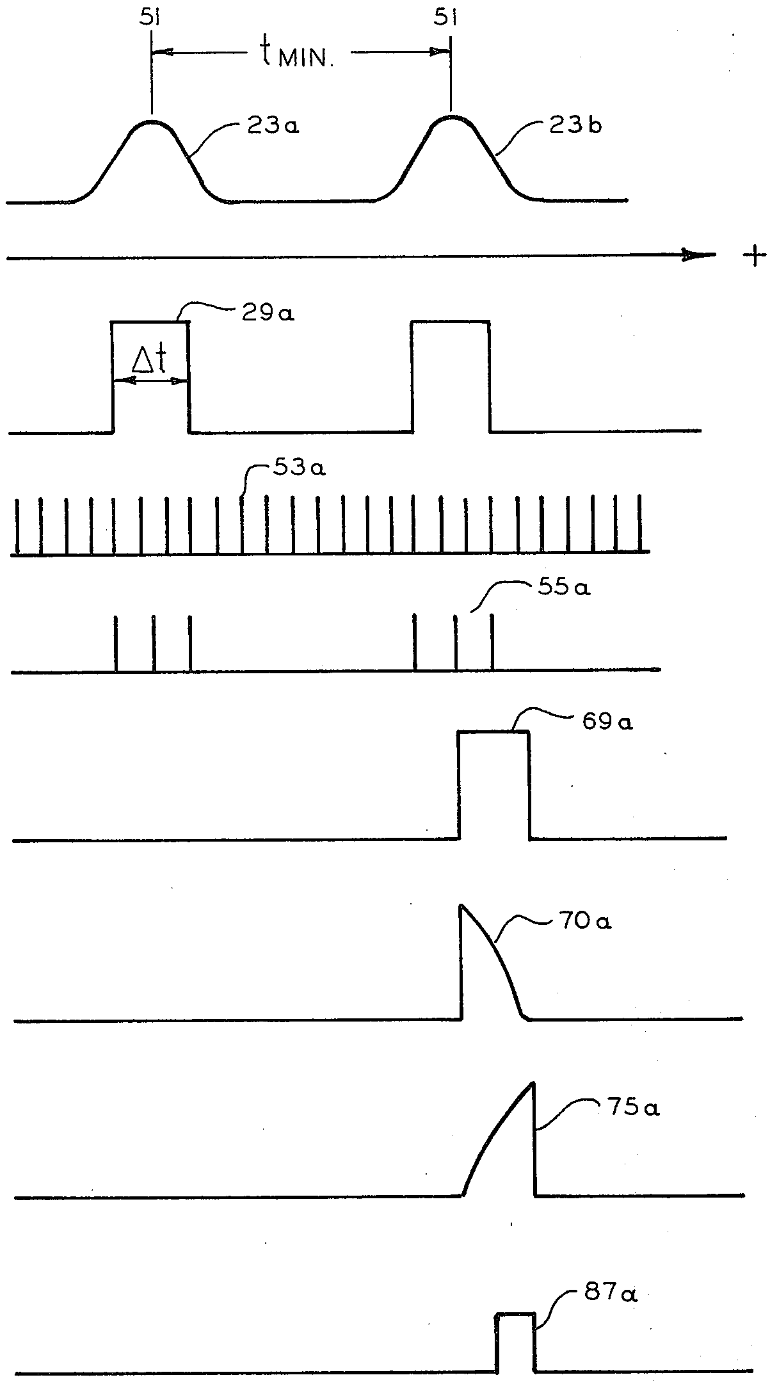
FIG. 3 is a wave-form diagram showing the shapes at various points in the system of FIG. 2.
Figure 4:
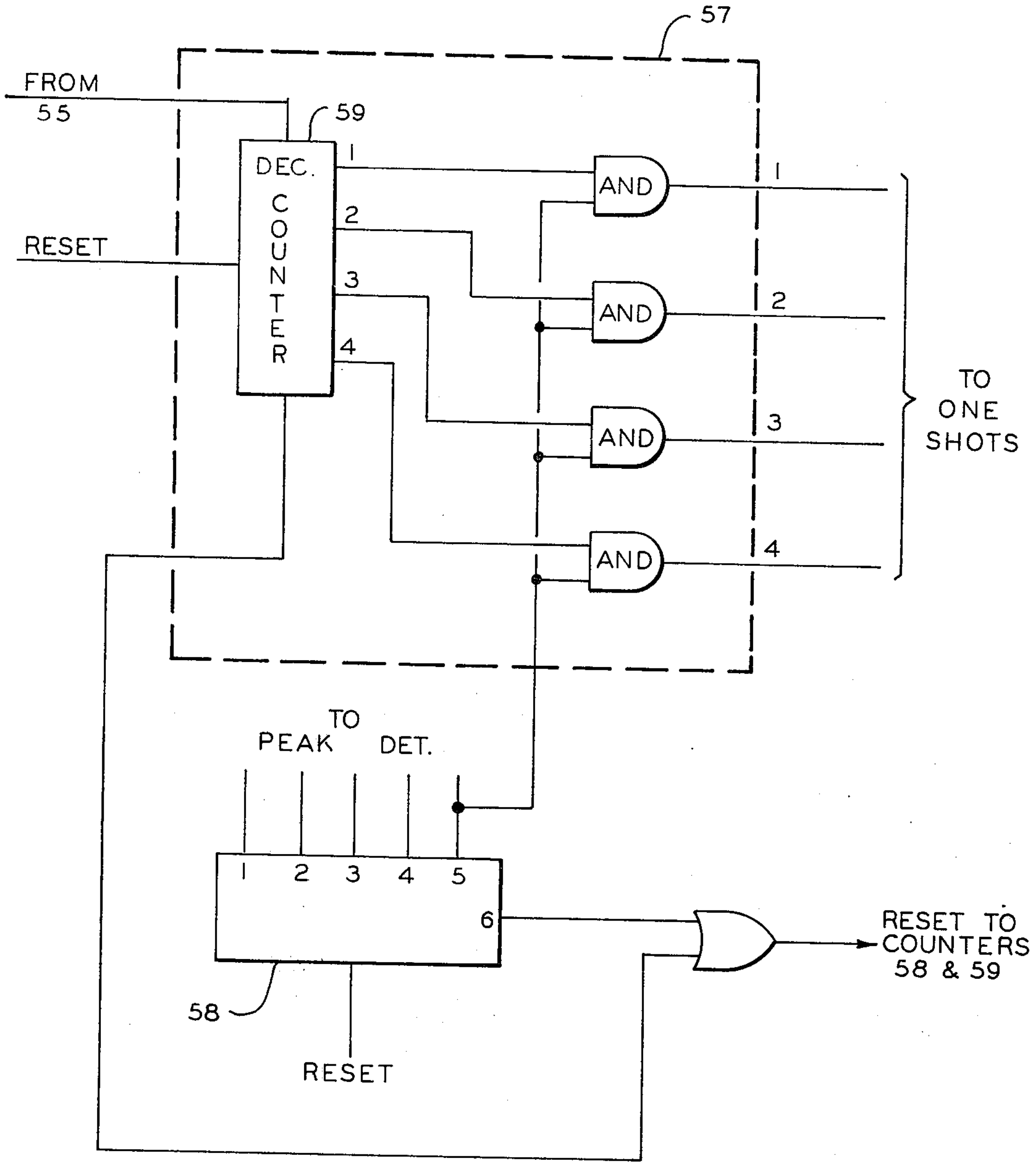
FIG. 4 is a more detailed logic diagram of the detector arrangement of FIG. 2.

An improved version of the detection system is shown in FIG. 2. Identical parts are given identical reference numerals hereon. Powering, magnetization and the manner of operation are the same as that described above and only the circuit differences will be described in detail. The output of amplifier 23 is shown on FIG. 3 by the curve 23*a* which is a plot of voltage against time. The line 51 indicates the center of the detected ferrous line on the bill. The output of the pulse shaper 29 is shown on waveform 29*a*. Clearly, its width designated $\Delta t$ will depend on the speed on which the detection head 11 moves relative to the bill. That is, the slower the speed the broader will be the pulses on the waveform 23*a* and thus the broader the pulses of the waveform 29*a*. These pulses along with pulses from a clock 53 operating at a frequency of 150 KHZ for example, are provided as inputs to a gated differential amplifier 55. This may comprise simply an AND gate along with the stage of amplification. If desired, the amplification stage may be omitted. The clock pulses are shown as waveform 53*a* on FIG. 3. The output of the gated differential amplifier 55 will be a series of pulses with the number of pulses proportional to the width $\Delta t$ of the pulses from the pulse shaper. Line spacing is such that at maximum speed at least five clock pulses will occur between pulses 23*d*. As shown, on FIG. 3 by the waveform 55*a*, these may comprise for example three clock pulses. (The range of operation is from one to four clock pulses per pulse 29*a*). These clock pulses are provided to a counter-detector module 57. There, the three clock pulses will be counted. At the same time, pulses from the clock 53 are provided to a second counter 58 which provides an enable input to the arrangement 57. As shown on FIG. 4, the counter block 57 comprises a decimal counter 59 to provide outputs indicating the number of pulses occurring. Also shown on this figure is the counter 58. The fifth output of the counter 59 is Ored with the sixth output of counter 58 to provide a reset for the counters 58 and 59. Coupled to the decimal outputs of the counter 59 are a plurality of AND gates 61 through 64 which are enabled by the fifth count output of counter 58. Thus, an output from gates 61 through 64 will be provided indicating the number of clock pulses per a pulse 29*a* occurring during the time normally required for five clock pulses. As noted above, the operator must move the detection head across the bill at a speed which will result in somewhere between 1 and 4 clock pulses per line. The respective output of the gates 61 through 64 are labelled 1 through 4 on FIG. 2 and are provided respectively to one shots 65 through 68. The one-shot output pulses of varying duration proportional to line width are proportional to pulse 29*a*, with one-shot 65 outputting the pulse of longest duration. These pulses are provided as inputs to an OR gate 69 with whichever pulse occurs being provided at the output thereof to a gated comparator 70. For the present example a pulse having a width approximately equal to $\Delta t/2$ will be provided from one shot 67. This pulse 69*a* due to a negative triggering will occur at the point shown on FIG. 3. The second input to gated comparator 70 is the output of amplifier 23 shown as 23*b* on FIG. 3, i.e., the pulse examined is the one after the pulse used to check speed. Because of delay caused by negative triggering the beginning of pulse 69*a* occurs at the peak of the waveform 23A and thus only the second half of the wave 23*a* will appear at the output of the gated comparator 70. This waveform is designated 70*a* on FIG. 3.

The output of the gated comparator is provided to a peak detector 71, the output of which is then provided to an integrator and lamp driver 73 driving the indicator lamp 43. Integrator and lamp driver 73 comprises the identical arrangement to that shown on FIG. 1 for that purpose, i.e., it will include the diode 35, capacitor 36, resistor 37 and transistors 39 and 41.

Figure 5:
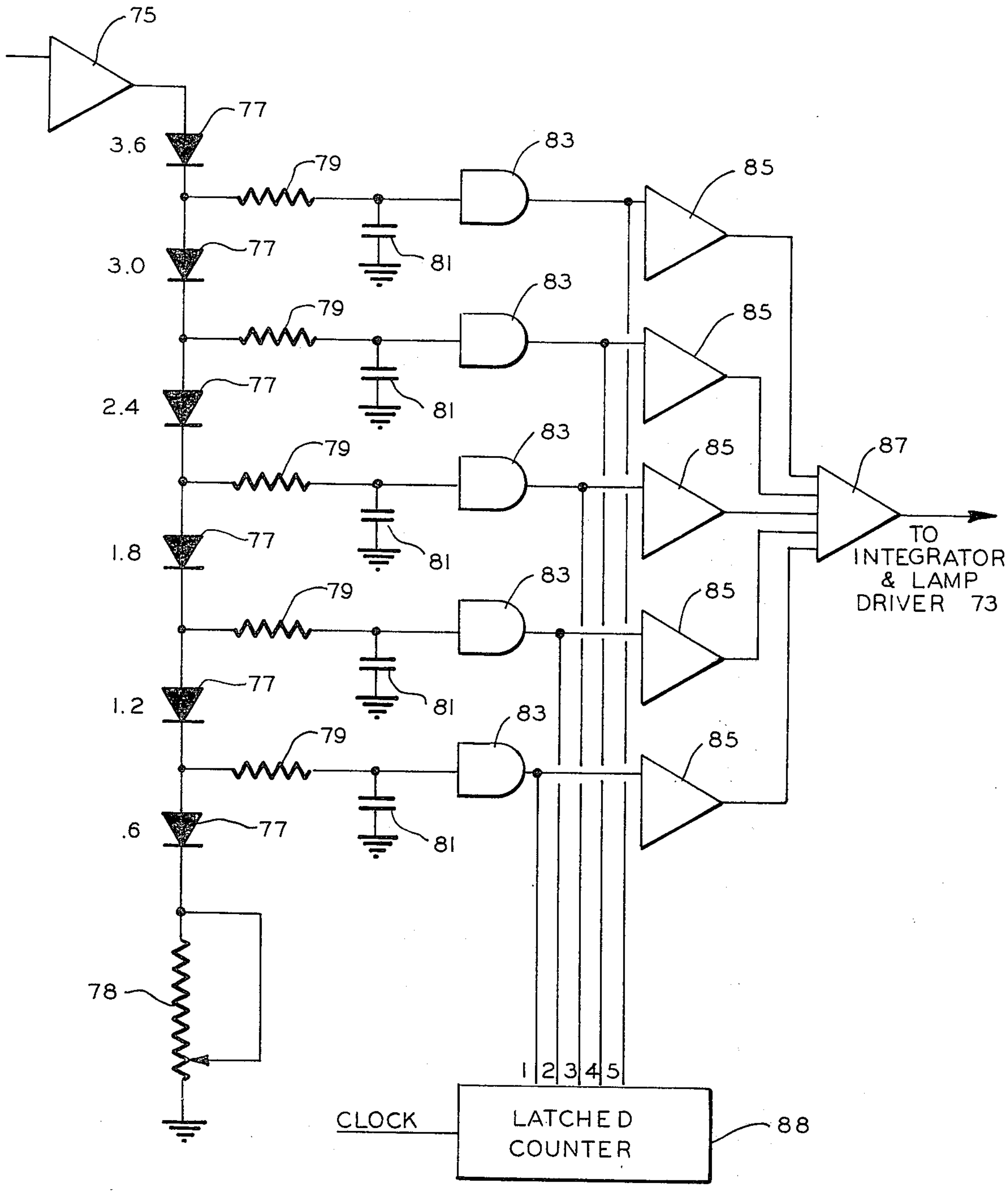
FIG. 5 is a more detailed drawing of the peak detector of FIG. 2.

The peak detector is illustrated on FIG. 5. The input from comparator 70 is provided through inversion stage 75 comprising an operational amplifier. The output will appear as shown by the waveform 75*a*. This output is provided through a plurality of six diodes 77 in series to ground. A potentiometer 78 is provided coupling the last diode to ground so that adjustment is possible. This is the potentiometer also shown on FIG. 2. Each of the diode junctions is coupled through a sampling resistor 79 to a gate 83. Gates 83 are used only for impedance matching purposes and can be any type of gate which does not invert the input signal. The inputs of gates 83 are also coupled to ground through capacitors 81. The capacitors 81 act to sample and store the voltages present at the junctions. The gate outputs are coupled to the respective outputs of a counter 88. This connection which is essentially a wired OR arrangement results in an Anding function as will be seen below. As noted above the gates 83 are coupled so that when the sample line goes high, the output of the gate will go high. The gate outputs are each coupled to an amplifier 85. The outputs of all the amplifiers 85 are coupled as inputs to a further amplifier 87 having its output coupled to the integrator and lamp driver 73 of FIG. 2. As the voltage waveform 75*a* appears on the diodes, the various breakpoints will gradually come up to the indicated voltages. Counter 88 is a latched counter. Counter 88 sequentially checks each of the diode points. When it one count output goes high, if the voltage 75*d* is rising properly or has already passed 0.6 and is stored at a capacitor 81, there will be a high at the output of the gate 83 associated with the 0.6 volt level, and this high will be reflected through the associated amplifier 85 to the amplifier 87. However, since all of the other counter outputs are still low, the other amplifier outputs will also be low holding the input to amplifier 87 at zero and thus holding its output at zero. If the 0.6V level is not present at the diode 77 associated therewith the gate 83 will remain low and prevent the first stage of the counter from going high. Thus the wired Or arrangement results in Anding operation. Only if the counter output And the gate output are present is a high output provided to amplifier 85. As a result, the counter will stop counting and nothing further will happen. Under these conditions, an output is impossible. Thus, unless the voltage rises properly the output will not appear. In similar fashion, the 1.2, 1.8, 2,4, and 3.0 levels are checked in sequence by sequential outputs from the counter. As each point is checked, and the voltage found to be present, its associated amplifier 85 will have a high output. Finally, when the last count is received, the amplifier 85 associated with the three volt level will go high. Now the amplifier 87 will have all high inputs and will provide an output which may be integrated by the integrator and lamp driver 73. But unless all points check out, no output will appear at amplifier 87. On the next pulse after an output, the counter will be reset so that the output from the amplifier 87 will appear as indicated by the waveform 87*a* on FIG. 3. This process will continue for a number of lines with the pulses 87*a* being integrated until a level is reached which will trigger the lamp driver circuit.

Thus, it can be seen that in order to obtain a proper output indicating a valid bill, a number of conditions must be met. In the first place, line spacing must be correct so that when the pulse 69*a* occurs, a pulse 23*b* is available to be looked at. Secondly, the level of magnetization must be proper in order for an output to be provided from the amplifier 87. More or less magnetic activity then is required will cause the amplifier 87 at the output of the peak detector to have no output. Finally, a plurality of properly spaced lines of this nature must be present in order that sufficient pulses 87*a* are integrated to provide an output indication. Thus, the arrangement of FIG. 2 provides a currency validator which checks the various features of the magnetic lines on the bill to the extent that a counterfeit, unless of extremely excellent quality, will not operate the detector. The counterfeiter to provide a bill which will activate the validator of the present invention must not only use magnetic ink but must have properly spaced and clearly defined lines of sufficient number and containing a required amount of magnetic material. Because of the difficulties in working with magnetic ink, such is almost impossible to accomplish. Thus an improved ferromagnetic currency validator has been shown.

Although specific embodiments of the invention have been illustrated and described, it will be obvious to those skilled in the art that various modifications may be made without departing from the spirit of the invention which is intended to be limited solely by the appended claims.

What is claimed is:

1. A currency validator comprising:

a. means to magnetize the magnetic ink on a bill to be validated;

b. detection means for detecting the level of magnetization and providing an output signal proportional thereto;

c. means to amplify said output signal, said amplification means being capacitively coupled to said detection means;

d. means for pulse shaping having its input coupled to the output of said means to amplify:

e. means for determining the rate of relative movement between the bill and said detection means having an input coupled to said pulse shaping means;

f. means having an input coupled to the output of said means for determining for providing a pulse output of length proportional to the time required to traverse a magnetic line on a bill, said means also being adapted to delay said output such that it occurs at the time when said detection means will be passing over another line based on the output from said means for determining;

g. first gating means having as in enabling input the output of said means providing a pulse output and as a second input the output of said means to amplify;

h. peak detecting means having as an input the output of said first gating means and providing an output;

i. integrating means coupled to the output of said peak detecting means;

j. an indicator lamp;

k. means having an input from said integrating means coupled to drive said indicator lamp.

2. A validator according to claim 1 wherein said means for determining comprise:

a. a clock;

b. a second gating means having as inputs the output of said clock and the output of said pulse shaper and providing as an output a number of clock pulses equal to the number of clock pulses occurring during a pulse from said pulse shaper;

c. a first counter having the output of said second gating means as an input;

d. a second counter having as an input the output of said clock and providing a first output after a first predetermined number of pulses and a second output after a second predetermined number of pulses;

e. a plurality of gates having the outputs of said first counter as inputs and enabled by the first output from said second counter; and wherein said means for providing a pulse output comprise:

f. a plurality of one shots having as inputs the outputs of said plurality of gates and adapted to generate pulses of a length proportional to the count of the counter provided to their associated gate; and g. OR gate means having as inputs the outputs of said plurality of one shots and providing its output as said pulse of predetermined duration to said first gating means.

3. A validator according to claim 1 wherein said validator is powered by a DC source and further including a push-button switch coupling said DC source and said validator whereby said validator need be powered only when operating.

4. A validator according to claim 3 wherein said DC source is a battery thereby making said validator portable.

5. A validator according to claim 5 wherein said means to magnetize comprises a DC electromagnet coupled through said push-button switch to said DC source.

6. A validator according to claim 1 wherein said peak detecting means comprise:

a. a plurality of diodes in series forming a diode ladder;

b. a plurality of storage capacitors;

c. a plurality or resistors one coupling each junction point between two diodes to one of said capacitors, each of said capacitors having its other terminal coupled to ground;

d. a plurality of gates having their inputs coupled to the junction of said resistors and capacitors, said gates adapted to provide an output at the same logic level as their input;

e. a latched counter having an input from said clock and having respective decimal outputs connected to the respective outputs of said gates;

f. a plurality of first amplifiers having as inputs the ouputs of said gates; and g. a second amplifier having the outputs of all of said first amplifiers as inputs, the output of said second amplifier being the circuit output and being provided to said integrating means.

7. A validator according to claim 1 wherein said amplification means comprise first and second amplifier stages.

8. A validator according to claim 7 wherein said first amplifier stage comprises an operational amplifier having capacitive and resistive feedback.

* * * * *